US008591050B2

(12) United States Patent
Yim

(10) Patent No.: US 8,591,050 B2
(45) Date of Patent: Nov. 26, 2013

(54) ELECTRONIC DEVICE

(75) Inventor: Vit Yim, Seoul (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 13/074,969

(22) Filed: Mar. 29, 2011

(65) Prior Publication Data

US 2012/0099292 A1 Apr. 26, 2012

(30) Foreign Application Priority Data

Oct. 25, 2010 (KR) ........................ 10-2010-0104266

(51) Int. Cl.
*G01D 11/28* (2006.01)

(52) U.S. Cl.
USPC ...... 362/23.19; 362/23.2; 362/97.1; 362/97.4

(58) Field of Classification Search
USPC .................. 362/23, 27, 29, 97.1–97.4, 23.01, 362/23.07, 23.12, 23.13, 23.19, 23.2; 200/312–314, 317; 345/170
See application file for complete search history.

(56) References Cited

U.S. PATENT DOCUMENTS

| | | | | |
|---|---|---|---|---|
| 4,006,546 | A * | 2/1977 | Anderson et al. | 40/573 |
| 4,254,453 | A * | 3/1981 | Mouyard et al. | 362/240 |
| 7,926,980 | B2 * | 4/2011 | Huang et al. | 362/257 |
| 2009/0268465 | A1 * | 10/2009 | Huang et al. | 362/267 |

* cited by examiner

*Primary Examiner* — Thomas Sember
(74) *Attorney, Agent, or Firm* — Birch, Stewart, Kolasch & Birch, LLP

(57) ABSTRACT

Disclosed herein is an electronic device including a case having an inner surface and an outer surface thereof; a recess portion recessed at the inner surface of the case toward the outer surface thereof such that a thickness of the case is thinner than that of its surrounding; a light source integrated into the case and disposed to face the recess portion; a circuit board connected to the light source to control power supply for the light source; and an icon generating portion disposed between the recess portion and the light source, and having a transparent pattern corresponding to an icon such that the light of the light source is passed therethrough while forming the icon to be seen at the outer surface of the case.

12 Claims, 8 Drawing Sheets

ELECTRONIC DEVICE

CROSS-REFERENCE TO RELATED APPLICATIONS

Pursuant to 35 U.S.C. §119(a), this application claims the benefit of earlier filing date and right of priority to Korean Application No. 10-2010-0104266, filed on Oct. 25, 2010, the contents of which is incorporated by reference herein in its entirety.

BACKGROUND OF THE INVENTION

1. Field of the Invention

The present invention relates to an electronic device in which an icon is disposed at an outer surface of the case thereof.

2. Description of Related Art

An electronic device is a device having a circuit based on an electronic apparatus or component, and in particular, a portable electronic device is an electronic device that can be hand-carried, as well as having at least one of an information input and/or output function, a data storage function, and the like.

As the functions becomes diversified, the electronic device is implemented in the form of a multimedia player having complicated functions such as capturing still or moving images, playing music or video files, gaming, receiving broadcast signals, and the like. On the other hand, a modem, a dongle or the like, which is a kind of the portable electronic device as an external peripheral device in a computer, a phone or the like, provides a voice and video communication function to an electronic device main body.

In recent years, as such an external peripheral device or electronic device main body is considered as a personal belonging for expressing his or her own personality, various design forms are required. A case of the electronic device is one of such design forms and thus a scheme for satisfying the design requirement for the terminal case may be taken into consideration.

BRIEF SUMMARY OF THE INVENTION

The present disclosure is to provide an externally flat-shaped electronic device case and an electronic device including the same.

The present disclosure is to provide an electronic device in which an icon is selectively formed at an outer surface of the case thereof.

In order to solve the foregoing objective, an electronic device according to an embodiment of the present disclosure may include a case having an inner surface and an outer surface thereof, a recess portion recessed at the inner surface of the case toward the outer surface thereof such that a thickness of the case is thinner than that of its surrounding, a light source integrated into the case and disposed to face the recess portion, a circuit board connected to the light source to control power supply for the light source, and an icon generating portion disposed between the recess portion and the light source and having a transparent pattern corresponding to an icon such that the light of the light source is passed therethrough while forming the icon to be seen at the outer surface of the case.

As an example associated with the present invention, the icon generating portion may include a transparent sheet disposed at the bottom of the recess portion, and a printed layer on which the transparent pattern is printed at one surface of the transparent sheet to be formed on the transparent sheet.

The printed layer may be made such that a portion excluding the transparent pattern is treated in a non-transparent manner. The printed layer may be tinted on a portion excluding the transparent pattern and may contain pigment in which light is passed through such that the surrounding of an icon seen at the outer surface of the case is formed with a different color from that of the case. The transparent sheet may be attached to the bottom of the recess portion, and an attached portion of the transparent sheet may be formed along a border of the transparent sheet.

As another example associated with the present invention, the icon generating portion may include a first pattern formed at the bottom of the recess portion, and made of a recessed engraving of the transparent pattern, and a transparent member having a second pattern corresponding to a raised engraving of the transparent pattern, and made of a transparent material and disposed such that the second pattern is inserted into the first pattern.

The transparent member may be made in a cylindrical shape having an upper surface, a lower surface and a lateral surface thereof, and the second pattern may be formed at an upper surface of the transparent member, and the light source is disposed to face a lower surface of the transparent member. A reflective coating layer may be formed at a lateral surface of the transparent member such that light entered through the lower surface faces the upper surface.

As another example associated with the present invention, the icon generating portion may include a transparent member at least part of which is inserted into the recess portion, and the bottom of the recess portion may be made flat, and the transparent pattern may be formed with a raised or recessed engraving at an upper surface of the transparent member facing the bottom. A receiving groove may be formed at a lower surface of the transparent member to receive the light source.

As another example associated with the present invention, the icon generating portion may include a non-transparent printed layer in which a portion excluding the transparent pattern is tinted to form the transparent pattern on the bottom of the recess portion.

As another example associated with the present invention, an electronic device may further include a light leakage prevention member formed to surround between the recess portion and the light source to prevent light leakage.

The light leakage prevention member may be made of a hollow body such that light generated from the light source is transmitted to the recess portion through a hollow portion thereof. The light source may be mounted on the circuit board, and the light source may be received in the hollow portion, and the light leakage prevention member may be formed of an elastic material such that both ends thereof are closely adhered to the circuit board and the bottom of the recess portion, respectively.

The icon generating portion may include a transparent sheet disposed at the bottom of the recess portion, and a printed layer printed at one surface of the transparent sheet such that a portion excluding the transparent pattern is treated in a non-transparent manner, wherein the transparent sheet is inserted between the bottom of the recess portion and one end of the light leakage prevention member.

The icon generating portion may include a transparent member inserted into the hollow portion, and the bottom of the recess portion may be made flat, and the transparent pattern may be formed with a raised or recessed engraving at an upper surface of the transparent member facing the bottom.

An insertion protrusion inserted into the hollow portion may be protruded at an inner surface of the case, and the insertion protrusion may form a closed loop limiting the recess portion.

As another example associated with the present invention, an outer surface of the case may be formed flat, and the case may be formed in a non-transparent manner such that the icon is not shown at the flat outer surface of the case when the power is not supplied.

Furthermore, according to the present disclosure, there is disclosed an electronic device including a case having an inner surface and an outer surface thereof made of a transparent material, a non-transparent treatment layer tinted or coated at the outer surface thereof such that the case is treated in a non-transparent manner, a light source mounted on a circuit board, and disposed to face the inner surface of the case, an icon generating portion disposed between the inner surface of the case and the light source and having a transparent pattern corresponding to an icon such that the light of the light source is passed therethrough while forming the icon to be seen at the non-transparent treatment layer, and a light leakage prevention member inserted between the circuit board and the inner surface of the case and made of a hollow body such that light generated from the light source is transmitted to the inner surface through a hollow portion.

The icon generating portion may include a transparent sheet disposed at an inner surface of the case, and a printed layer printed at one surface of the transparent sheet such that a portion excluding the transparent pattern is treated in a non-transparent manner.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
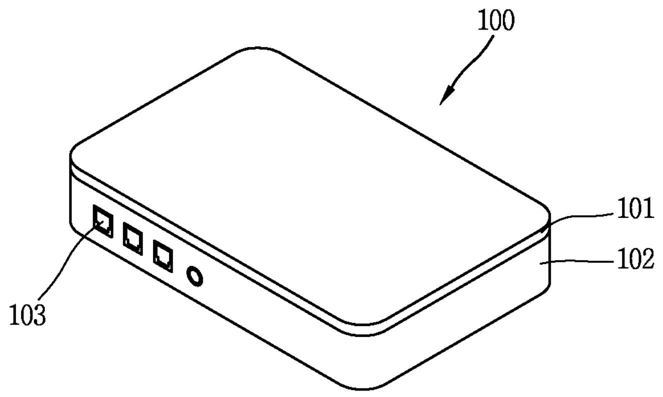
FIG. 1 is a perspective view illustrating an electronic device associated with an embodiment of the present invention.

Hereinafter, an electronic device associated with the present invention will be described in more detail with reference to the accompanying drawings. The suffixes "module" and "unit or portion" for components used in the following description merely provided only for facilitation of preparing this specification, and thus they are not granted a specific meaning or function.

This specification employs like/similar reference numerals for like/similar components irrespective of different embodiments, so they all will be understood by the first description. The expression in the singular form in this specification will cover the expression in the plural form unless otherwise indicated obviously from the context.

Figure 2:
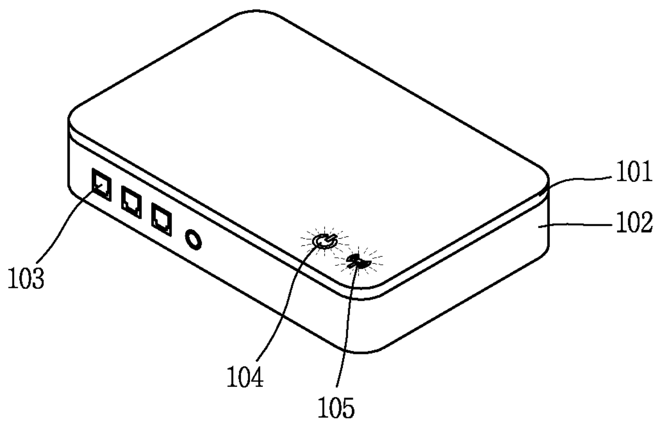
FIG. 2 is an operational view illustrating a case where an icon is formed in the electronic device of FIG. 1.

FIG. 1 is a perspective view illustrating an electronic device associated with an embodiment of the present invention, and FIG. 2 is an operational view illustrating a case where an icon is formed in the electronic device of FIG. 1.

An electronic device disclosed herein illustrates a modem, but the present invention will not be limited to this. In other words, an electronic device illustrated herein may include a laptop computer, a tablet PC, a smart phone, a digital broadcasting terminal, a personal digital assistants (PDA), a portable multimedia players (PMP), a navigator, a dongle, and the like.

As illustrated in FIGS. 1 and 2, a body of the electronic device 100 may include a case (housing, casing, cover, etc.) forming the outside thereof.

In this embodiment, the case may be divided into a front case 101 and a rear case 102. In addition, various electronic components may be incorporated into a space between the front case 101 and the rear case 102. At least one intermediate case may be additionally disposed between the front case 101 and the rear case 102.

The cases 101, 102 may be formed such that light is passed therethrough at a low thickness but not passed therethrough at a high thickness. For such an example, the cases 101, 102 may be formed by injection molding a synthetic resin. However, the present invention is not limited to this, and at least part of the cases 101, 102 may be formed with a metallic material such as stainless steel (STS) and titanium (Ti).

An interface unit 103 is mounted on a body of the electronic device 100. The interface unit 103 performs a role of passage with all external devices connected to the electronic device 100. The interface unit 103 may allow a data reception from an external device, a power delivery to each component in the electronic device 100, or a data transmission from the electronic device 100 to an external device. The interface unit 103 may include, for example, wired/wireless headset ports, external charger ports, wired/wireless data ports, memory card ports, ports for coupling devices having an identification module, audio Input/Output (I/O) ports, video I/O ports, earphone ports, and the like.

Furthermore, the interface unit 103 may be formed to be detachably mounted on a connection port of other electronic devices. As an example of the interface unit 103, the interface unit 103 may include a USB port.

The electronic device 100 includes one or more modules allowing radio communication between the electronic device 100 and another wireless communication system, or allowing radio communication between the electronic device 100 and a network in which the electronic device 100 is located. For example, the electronic device 100 may include a broadcast receiving module, a mobile communication module, a wireless Internet module, a short-range communication module, a location information module, and the like. Furthermore, an antenna for radio communication of data may be disposed within the electronic device 100. Radio signals transmitted and received by the antenna may be used for wireless data communication with another electronic device.

The electronic device 100 may be formed to display a current operating state of the electronic device 100 to the outside. Such a display may be implemented by icons 104, 105 displayed on an outer surface of the electronic device. The icons may be a first and a second icon 104, 105 corresponding to supplying power or transmitting and receiving radio signals. However, the present invention will not be limited to this, and one or more icons may be displayed on an outer surface of the electronic device.

More specifically, if power is supplied and radio signals are detected in a state that the first and the second icon 104, 105 are not displayed thereon (a state of FIG. 1, hereinafter, referred to as a "first state"), then the first and the second icon 104, 105 are displayed thereon, respectively (a state of FIG. 2, hereinafter, referred to as a "second state").

Referring to the drawings, a portion where the first and the second icon 104, 105 are displayed on an outer surface of the electronic device 100 is formed with a flat plane with no grooves or ruggedness or a curved surface. Accordingly, the shape of an icon on a sleek appearance may not be seen to the eyes in the first state, thereby allowing a design using a method of displaying an icon in the second state. Hereinafter, a mechanism for implementing the design will be described in more detail.

Figure 3:
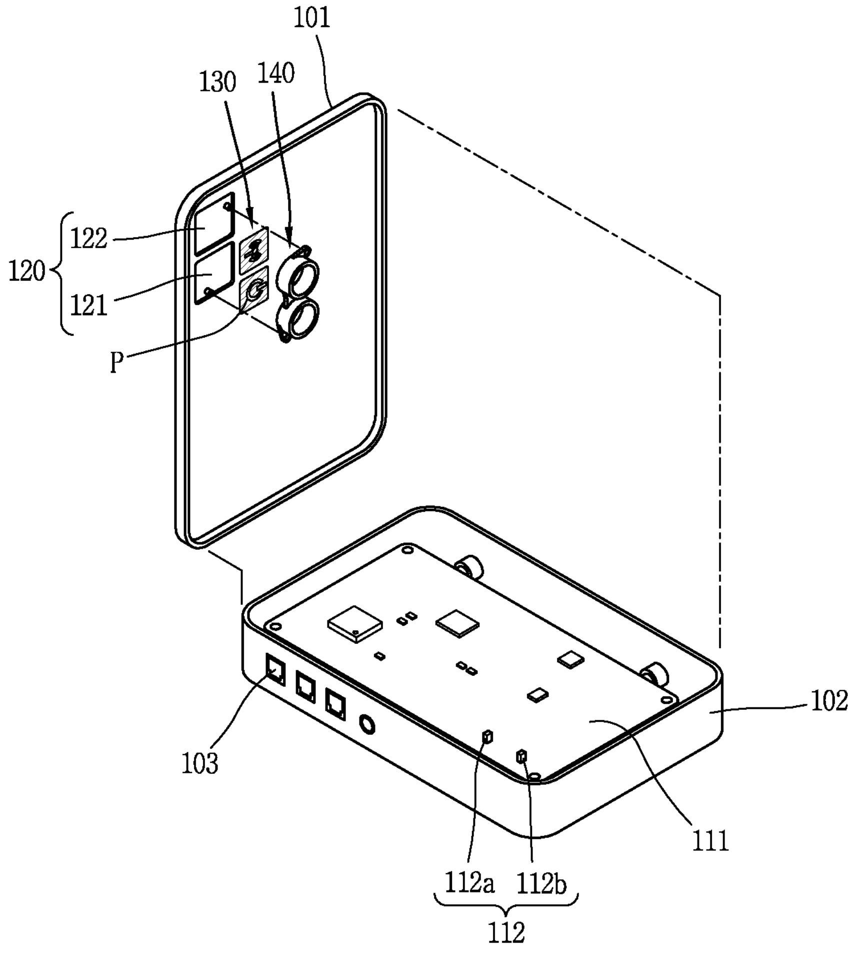
FIG. 3 is a partial exploded view illustrating the electronic device of FIG. 1.
Figure 4:
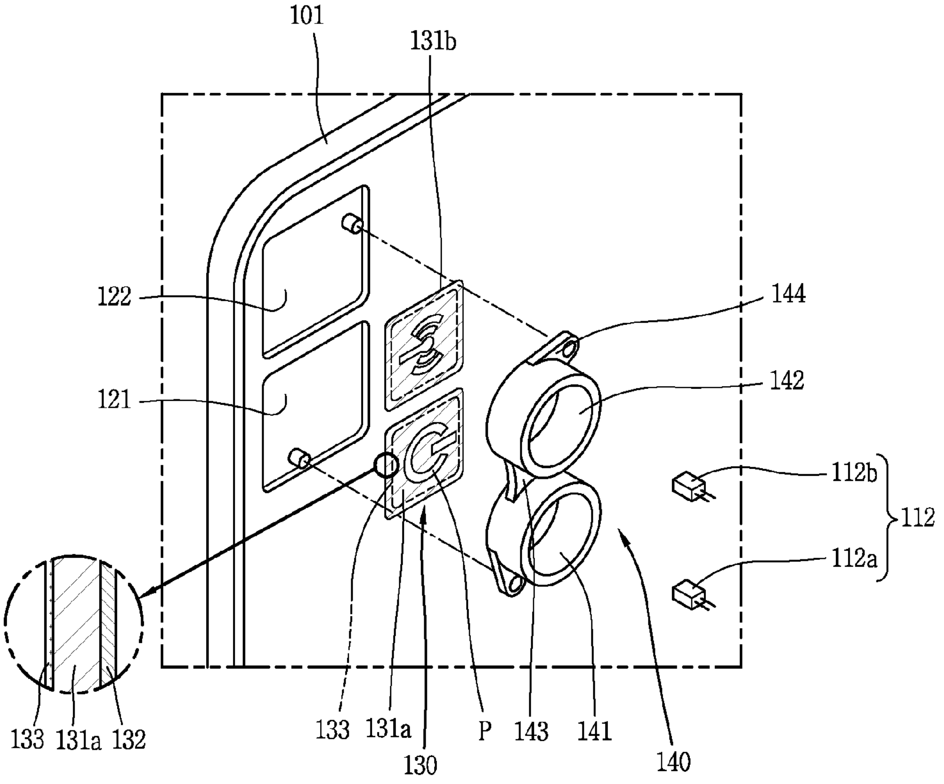
FIG. 4 is a partial enlarged view of FIG. 3.
Figure 5A:
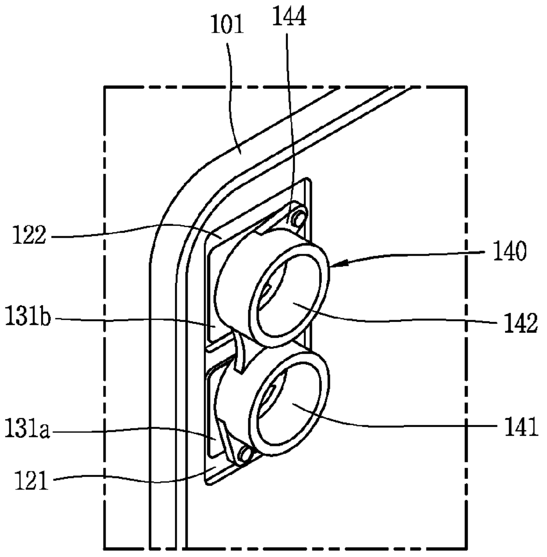
FIGS. 5A and 5B are a combined view and a cross-sectional view of FIG. 4, respectively.
Figure 5B:
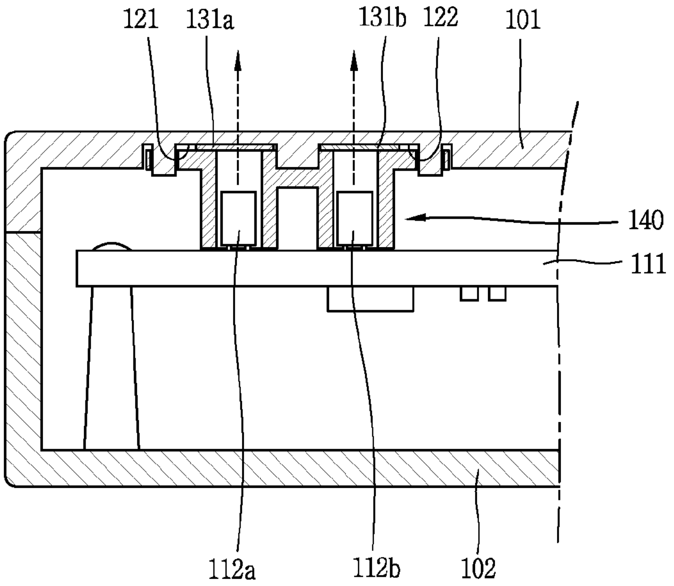

FIG. 3 is a partial exploded view illustrating the electronic device of FIG. 1, and FIG. 4 is a partial enlarged view of FIG. 3, and FIGS. 5A and 5B are a combined view and a cross-sectional view of FIG. 4, respectively.

According to the drawings, a circuit board 111 is mounted in a built-in space formed between the front case 101 and the rear case 102. The circuit board 111 may be connected to an antenna (not shown), and formed to process radio signals transmitted and received at the antenna, and may be connected to the interface unit 103 (refer to FIG. 1).

A light source 112 is mounted on one surface of the circuit board 111. However, the present invention will not be limited to this, and the light source 112 may be formed to be mounted on another portion within the electronic device 100, and electrically connected to the circuit board 111.

The light source 112 may be formed to generate light, and power supply is controlled by the circuit board 111. The light source 112 may be a light emitting diode (LED), an organic light emitting diode (OLED), or the like.

Referring to the drawings, a recess portion 120 is formed at an inner surface of the front case 101. The recess portion 120 is recessed at an inner surface of the case toward the outer surface thereof such that a thickness of the case is thinner than that of its surrounding. More specifically, the recess portion 120 is recessed to have a thickness allowing the front case 101 to penetrate light generated from the light source. On the contrary, an outer surface of the front case 101 is made of a flat surface with no additional accessories for displaying icons.

Furthermore, the front case 101 is formed in a non-transparent manner such that the icons are not shown at a flat outer surface of the front case 101 when power is not supplied.

According to the drawing, the light source 112 is disposed to face the recess portion 120. Furthermore, a plurality of the recess portions 120 are provided to correspond to the first and the second icon 104, 105 (refer to FIG. 2), and the light source 112 is made of a first and a second light source 112*a*, 112*b* to correspond to the first and the second recess portion 121, 122.

The light generated from the light source 112 forms the icons 104, 105 while passing through the icon generating portion 130, and the icons 104, 105 are seen at an outer surface of the front case 101 by a thin thickness of the recess portion 120. A plurality of the icon generating portions 130 may be formed to generate the first and the second icon.

According to the drawing, the icon generating portion 130 is disposed between the recess portion 120 and the light source 112, and provided with a transparent pattern (P) corresponding to the icons 104, 105.

More specifically, the icon generating portion 130 may include transparent sheets 131*a*, 131*b*, and a printed layer 132.

The transparent sheets 131*a*, 131*b* are made of a light transmission material such as transparent acryl or transparent polycarbonate (PC). For example, the transparent sheets 131*a*, 131*b* are attached to the bottom of the recess portion 120, and an attached portion 133 of the transparent sheets 131*a*, 131*b* is formed along a border of the transparent sheets 131*a*, 131*b*. More specifically, such an attached portion 133 is implemented by an adhesive or double-sided tape, and formed in a closed-loop shape such that the adhesive or double-sided tape is not disposed at the center of the transparent sheets 131*a*, 131*b*.

The printed layer 132 is printed at one surface of the transparent sheets 131*a*, 131*b* such that a transparent pattern (P) is formed on the transparent sheets 131*a*, 131*b*. For example, the printed layer 132 is formed such that a portion excluding the transparent pattern (P) is treated in a non-transparent manner.

More specifically, a plurality of the transparent sheets 131*a*, 131*b* are provided thereon, and the printed layer 132 may be formed with a different shape on a rear surface of the transparent sheets 131*a*, 131*b*, respectively. Through this, patterns corresponding to the first and the second icon are formed on the transparent sheets 131*a*, 131*b*, respectively.

According to such a mechanism, the circuit board 111 supplies power to the first light source 112*a* when the electronic device 100 is turned on, and light generated from the light source 112*a* forms a first icon 104 while passing through the first transparent sheet 131*a*, and thus the first icon 104 is passed through a thin thickness of the front case 101 to be shown at an outer surface of the front case 101. Furthermore, the electronic device 100 detects radio signals when an antenna is normally operated to implement the transmission and reception of radio signals, and the second icon 105 is shown at an outer surface of the front case 101 when the circuit board 111 supplies power to the second light source 112*b*.

In addition, the first and the second recess portion 121, 122 may be disposed to be separated from each other. In other words, only a portion formed with an icon has a low thickness, and through this, the strength and rigidity of the case can be secured in spite of a plurality of icons.

Referring to the drawings, a light leakage prevention member 140 is formed within the electronic device 100 to prevent light leakage. The light leakage prevention member 140 is formed to surround between the recess portion 120 and the light source 112.

The light leakage prevention member 140 is made of a hollow body such that light generated from the light source 112 is transmitted to the recess portion 120 through a hollow portion thereof. Referring to FIG. 5B, the light source 112 is accommodated in a hollow portion of the light leakage prevention member 140, and the light leakage prevention member 140 is formed such that both ends thereof are closely adhered to the circuit board 111 and the bottom of the recess portion 120, respectively. For example, the light leakage prevention member 140 may be made of a dark colored elastic material such as black rubber, and through this, the close adhesion may be possible, and moreover, a gap between the circuit board 111 and the recess portion 120 may be sealed.

Referring to FIGS. 4 and 5A, a transparent sheet 131 may be inserted between the bottom of the recess portion 120 and an end of the light leakage prevention member 140. For this purpose, the transparent sheets 131*a*, 131*b* may be formed larger than a diameter of the hollow body of the light leakage prevention member 140. Through this, an area of the attached portion 133 may allow at least the transparent sheets 131*a*, 131*b* to be fixed thereto.

The first and the second light source 112*a*, 112*b* are disposed to be separated from each other, the light leakage prevention member 140 is made of a plurality of hollow bodies 141, 142 to accommodate the first and the second light source 112*a*, 112*b*, respectively. The plurality of hollow bodies 141, 142 may be connected to each other by a connecting portion 143 protruded at a circumferential surface thereof to be formed as a single body. Furthermore, a connection protrusion 144 is protruded at a circumference of the plurality of hollow bodies 141, 142, and a through hole into which a boss of the front case 101 is inserted is formed at the connection protrusion 144. Through such a structure, the light leakage prevention member 140 may be fixed to a position designed between the front case 101 and the circuit board 111 without any additional fastening element.

Hereinafter, referring to FIGS. 6 through 10, various modified examples of an electronic device associated with the present invention will be described.

Figure 6:
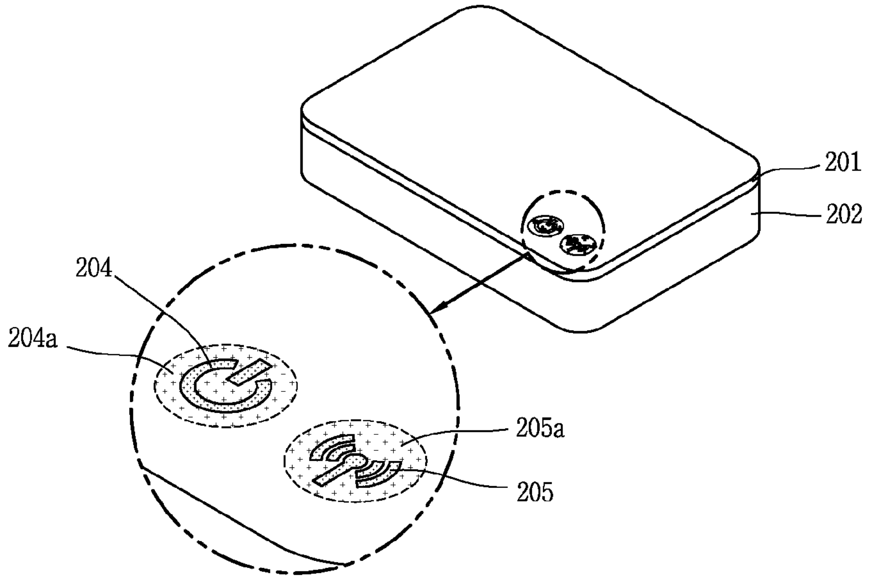
FIG. 6 is a perspective view illustrating a modified example of an electronic device associated with present disclosure.

FIG. 6 is a perspective view illustrating a modified example of an electronic device associated with present disclosure.

Referring to the drawing, icons 204, 205 as well as background regions 204*a*, 205*a* of the icons 204, 205 are displayed at an outer surface of the electronic device. In other words, the background regions 204*a*, 205*a* form a border of the icons 204, 205 seen at an outer surface of the front case 201.

More specifically, a portion excluding the transparent pattern (P; refer to FIG. 4) is tinted with pigment at the printed layer 132 of the transparent sheet 131. The light is passed through the pigment, which is made of a different color from that of the front case 201.

Figure 7A:
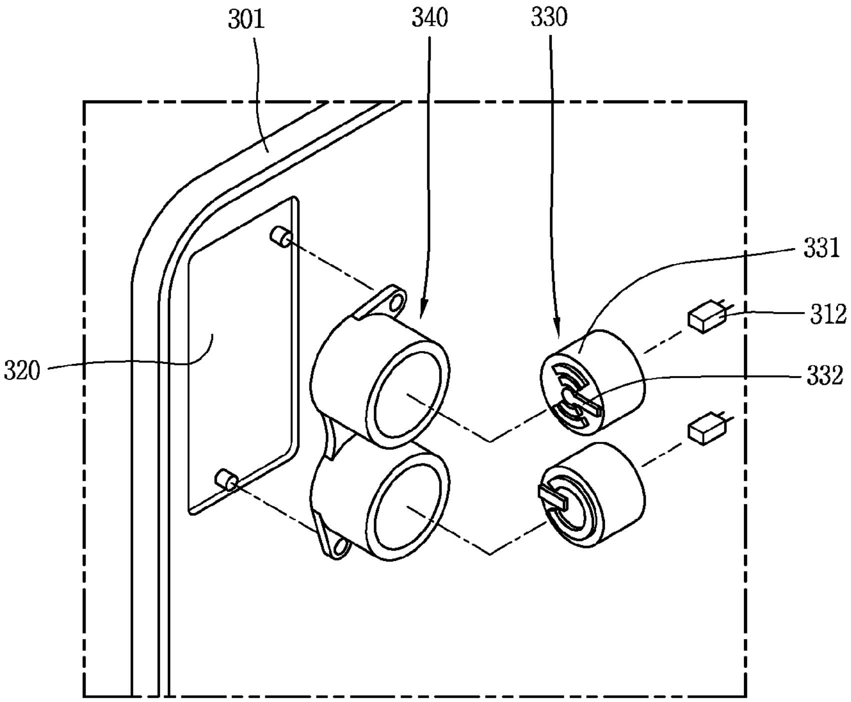
FIGS. 7A and 7B are a partial exploded view and a cross-sectional view illustrating another modified example of an electronic device associated with the present disclosure.
Figure 7B:
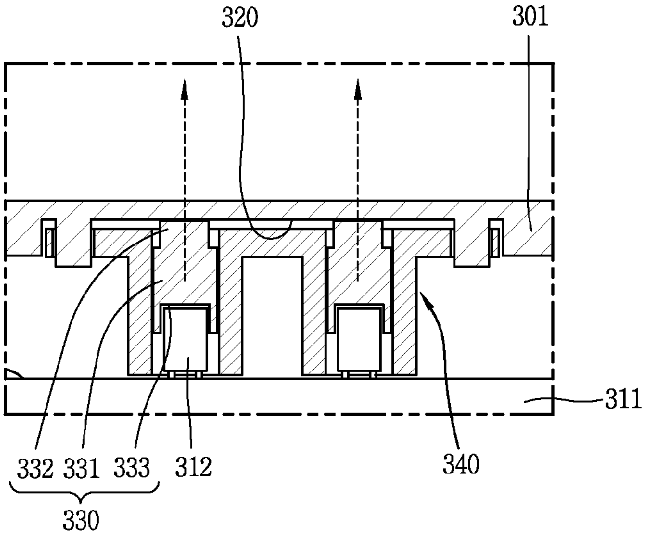

FIGS. 7A and 7B are a partial exploded view and a cross-sectional view illustrating another modified example of an electronic device associated with the present disclosure.

According to the drawing, at least part of the icon generating portion 330 may include a transparent member 331 inserted into the recess portion 320. The bottom of the recess portion 320 is made flat, and a transparent pattern is formed with a raised engraving 332 or recessed engraving at an upper surface of the transparent member 331 facing the bottom. The transparent member 331 and the raised engraving 332 may replace the transparent sheet and printed layer in the embodiment described with reference to FIGS. 3 through 5B.

Furthermore, the transparent member 331 may be inserted into a hollow portion of the display unit 340. For the insertion, an outer diameter of the transparent member 331 may be formed in a cylindrical shape with a size that is similar to the hollow portion.

According to the drawing, a receiving groove 333 is formed at a lower surface of the transparent member 331 to receive a light source 312. The receiving groove 333 is formed at a lower surface of the transparent member 331 to be recessed toward an upper surface thereof. Through this, a gap between the light source 312 and the raised engraving 332 is closer, and thus the light source 312 can be protected from an external shock to the electronic device.

Furthermore, a reflective coating layer (not shown) may be formed at a lateral surface of the transparent member 331 such that light entered through the lower surface of the transparent member 331 faces the upper surface of the transparent member 331. The reflective coating layer, for example, may be formed by a total reflective coating performed at a lateral surface of the transparent member 331, and through this, the brightness of icons that is seen at an outer surface of the electronic device may be more enhanced with respect to the same power supply amount.

Figure 8A:
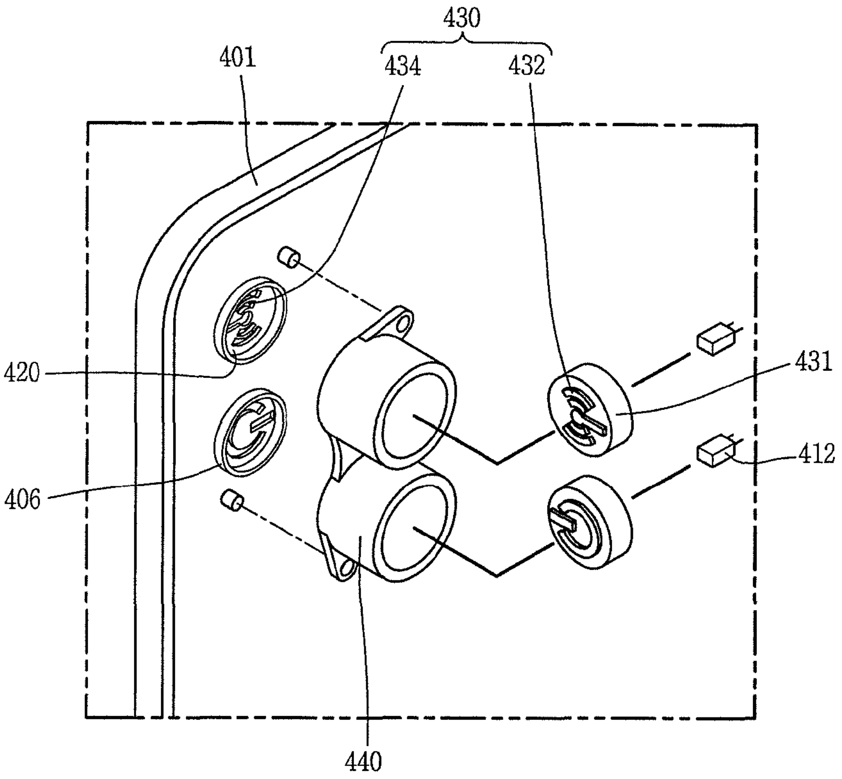
FIGS. 8A and 8B are partial exploded views illustrating still another modified example of an electronic device associated with the present disclosure.
Figure 8B:
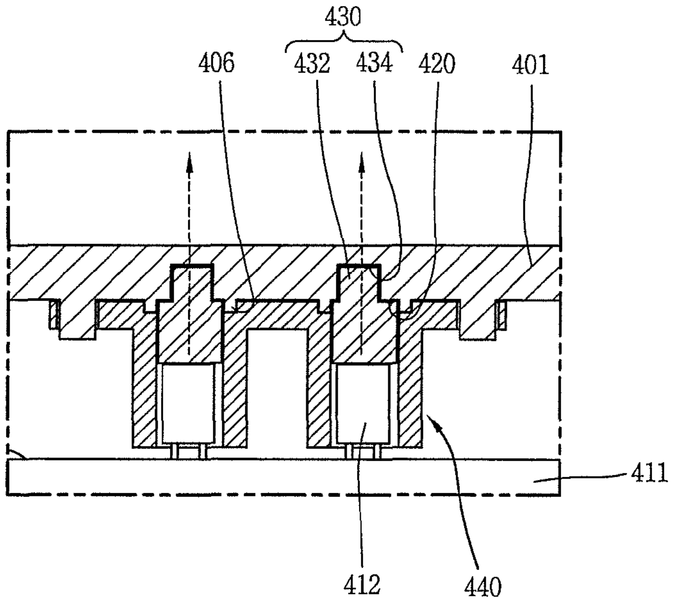

FIGS. 8A and 8B are partial exploded views illustrating still another modified example of an electronic device associated with the present disclosure.

Referring to the drawing, the icon generating portion 430 may include a first and a second pattern 434, 432.

The first pattern 434 is formed at the bottom of the recess portion 420, and made of a recessed engraving of the icon. The first pattern 434 may be engraved with a recessed engraving at the bottom of the recess portion 420, for example, by laser cutting, or the like.

The second pattern 432 is made of a raised engraving of the icon, and formed at an upper surface of the transparent member 431. The transparent member 431 is disposed such that the second pattern 432 is inserted into the first pattern 434. When light is generated from the light source facing a lower surface of the transparent member 431, the light forms the shape of an icon while passing through the first and the second pattern 434, 432.

The first pattern 434 is engraved with a recessed engraving again at a thin recess portion 420, and thus it may have a high probability of generating shrinking failure when the first pattern 434 is injection molded as a single. However, when the transparent member 431 is double injection-molded in a state of being inserted into an injection mold, the second pattern 432 of the transparent member 431 fills a narrow groove of the first pattern 434, thereby not allowing shrinking failure to be generated. According to such a structure, the first pattern 434 may be formed not by cutting, but by double injection-molding.

According to the drawing, an insertion protrusion 406 inserted into the hollow portion of the light leakage prevention member 440 is protruded at an inner surface of the front case 401. The insertion protrusion 406 may form a closed loop limiting the recess portion 420, and through this, the light leakage prevention structure for a portion where the light leakage prevention member 440 is brought into contact with an inner surface of the front case 401 may be more enhanced. It is useful as a light leakage prevention structure when the inner surface of the front case 401 is a curved surface.

Figure 9:
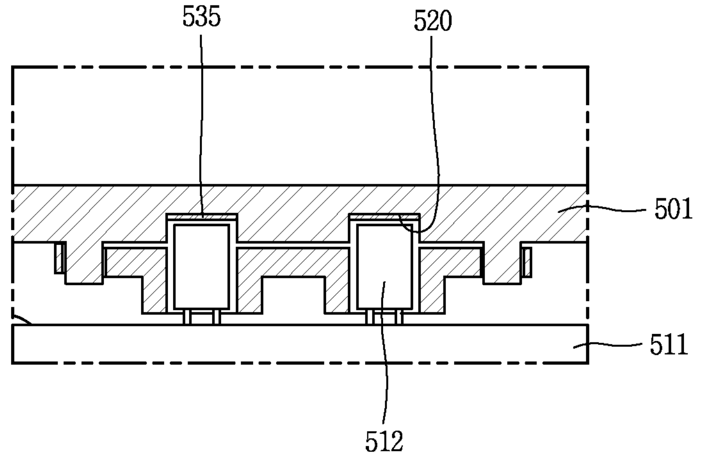
FIG. 9 is a partial exploded view illustrating still another modified example of an electronic device associated with the present disclosure.

FIG. 9 is a partial exploded view illustrating still another modified example of an electronic device associated with the present disclosure.

Referring to the drawing, the icon generating portion 530 may include a non-transparent printed layer 535.

The non-transparent printed layer 535 is formed such that a portion excluding the transparent pattern is tinted to form a transparent pattern on the bottom of the recess portion 520. According to such a structure, the electronic device may selectively form an icon without using the transparent sheet 131 (refer to FIG. 4) or transparent member 331 (refer to FIG. 7).

Figure 10:
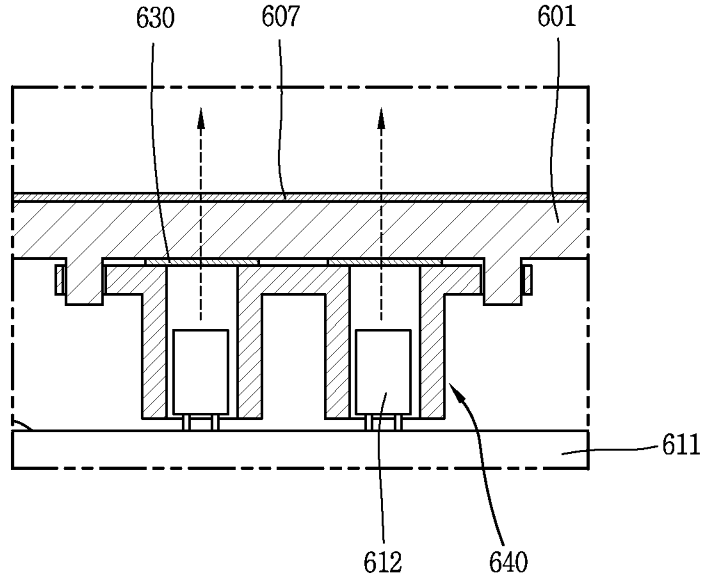
FIG. 10 is a cross-sectional view illustrating still another modified example of an electronic device associated with the present disclosure.

FIG. 10 is a cross-sectional view illustrating still another modified example of an electronic device associated with the present disclosure.

Referring to the drawing, a front case 601 is made of a synthetic resin such as transparent acryl or transparent polycarbonate (PC), and a non-transparent treatment layer 607 is formed at the outer surface of the front case 601 such that the front case 601 is treated in a non-transparent manner.

The non-transparent treatment layer 607 may be formed at an outer surface of the front case 601 by tinting or coating a pigment, a coating agent, or the like. According to the drawing, the light source 612 mounted on the circuit board 611 is disposed to face an inner surface of the front case 601 and accommodated in the light leakage prevention member 640. The light leakage prevention member 640 is inserted between the circuit board 611 and an inner surface of the case 601.

An icon generating portion 630 is disposed between an inner surface of the case 601 and the light source 612, and includes a transparent sheet 631 formed with a printed layer such that the light of the light source 612 is passed therethrough while forming the icon to be seen at the non-transparent treatment layer 607. The printed layer is printed at one surface of the transparent sheet 631 such that a portion excluding the transparent pattern is treated in a non-transparent manner.

According to such a structure, it may be possible to implement an icon selectively exposed to the outside while maintaining the thickness of the case.

Figure 11:
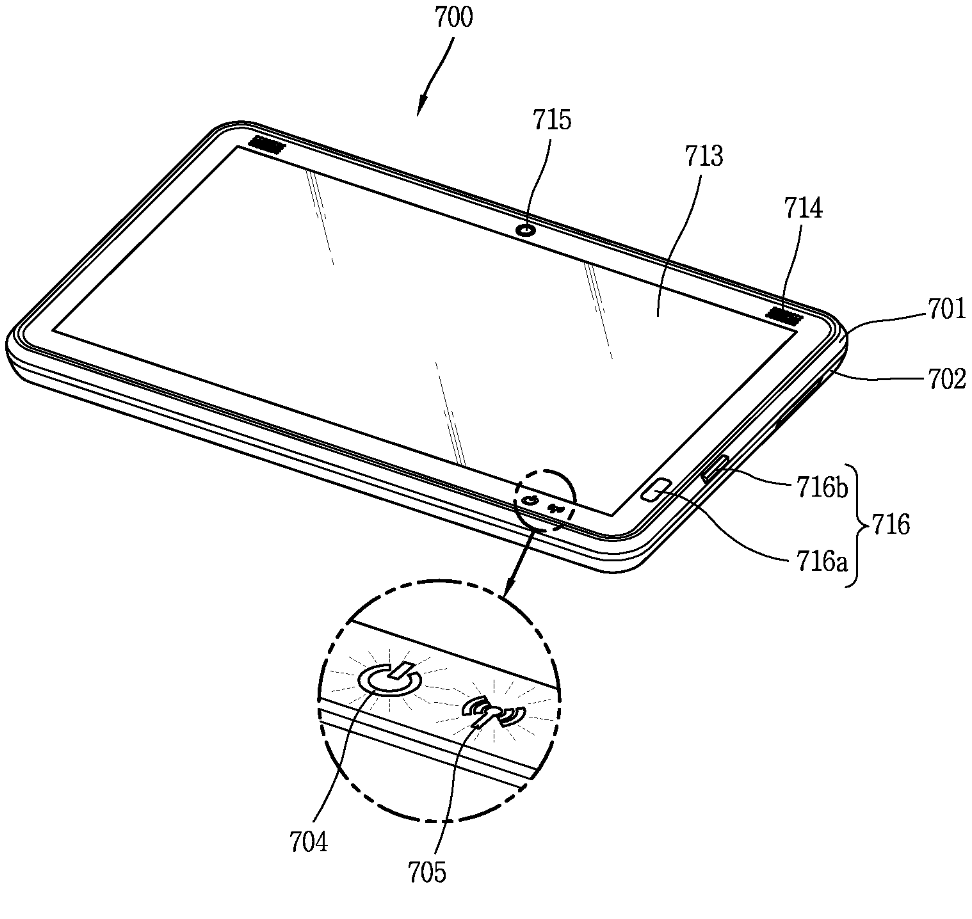
FIG. 11 is a perspective view illustrating another example of an electronic device associated with the present disclosure.

FIG. 11 is a perspective view illustrating another example of an electronic device associated with the present disclosure, and FIG. 11 illustrates a tablet PC as an example of the electronic device (or portable electronic device).

A display unit 713, an audio output module 714, a camera 715, a user input unit 716 and the like may be disposed on the electronic device body of the electronic device 700, particularly, on the front case 701.

The display unit 713 may occupy most of a main surface of the front case 701.

The display unit 713 is provided to display visible information or image information, and the display unit 713 may include at least one of a liquid crystal display (LCD), a thin film transistor-liquid crystal display (TFT LCD), an organic light-emitting diode (OLED), a flexible display, or a three-dimensional (3D) display. The display unit 713 may include a touchpad for allowing information input by a user's touch input. In this case, the display unit 713 may operate as a touch screen.

The user input unit 716 may be manipulated to receive commands for controlling the operation of the electronic device 700, and may include a plurality of manipulation units 716*a* and 716*b*. The manipulation units 716*a* and 716*b* may also be commonly referred to as a manipulating portion, which can be manipulated in any tactile manner that the user can make a touch input. The manipulation units 716*a* and 716*b* may be implemented as a key pad, a dome switch, a touch pad (e.g., static pressure/capacitance), a jog wheel, a jog switch and the like.

The audio output module 714 and the camera 715 may be disposed at a region adjacent to one of both ends of the display unit 713. The audio output module 714 may be implemented in the form of a speaker, a receiver, and the like. The camera 715 may be provided in an electronic device body in a rotatable or pop-up manner.

According to the drawing, icons 704, 705 are displayed at a region adjacent to the other one of the both ends of the display unit 713. The icons 704, 705 are selectively formed at a flat plane with no grooves or ruggedness or a curved surface on an outer surface of the electronic device 700, and may be implemented according to the foregoing embodiments with reference to FIGS. 1 through 10.

An electronic device having the foregoing configuration associated with the present disclosure may implement an icon that can be seen when driving a specific function without being exposed at the outside thereof through a recess portion, an icon generating portion, and the like.

Furthermore, according to the present disclosure, the bottom of the recess portion may be made flat, thereby reducing the production failure rate. On the contrary, even when the bottom of the recess portion is formed with a recessed engraving, a raised engraving of the transparent member may be filled at the recessed engraving, thereby enhancing the production reliability.

In addition, according to the present disclosure, light generated from the light source through a light leakage prevention member may be focused on a specific portion of the case. Moreover, the transparent member may be received in a hollow portion of the light leakage prevention member, thereby more facilitating the coupling of the transparent member.

Furthermore, according to the present disclosure, it may be implemented an icon selectively exposed to the outside while maintaining a thickness of the case through a transparent case, an icon generating portion, and the like.

The configurations and methods according to the above-described embodiments will not be applicable in a limited way to the foregoing electronic device, and all or part of each embodiment may be selectively combined and configured to make various modifications thereto.

What is claimed is:

1. An electronic device, comprising:
- a case having an inner surface and an outer surface;
- a recess portion formed in the inner surface of the case, the recess portion extending toward the outer surface;
- a light source located in the case and disposed to face the recess portion;
- a circuit board connected to the light source to control power supply for the light source; and
- an icon generating portion disposed between the recess portion and the light source, the icon generating portion having a transparent pattern corresponding to an icon such that the light from the light source passing therethrough causes the icon to be visible at the outer surface of the case, the icon generating portion including:
  - a transparent sheet disposed at a bottom portion of the recess portion; and
  - a printed layer formed on one surface of the transparent sheet to define the transparent pattern.

2. The electronic device of claim 1, wherein the printed layer is made such that a portion excluding the transparent pattern is treated to be non-transparent.

3. The electronic device of claim 1, wherein the printed layer is tinted on a portion of the transparent sheet excluding the transparent pattern, the portion excluding the transparent pattern containing pigment such that light passing through the tinted portion is visible at the outer surface of the case and is of a different color from that of the case.

4. The electronic device of claim 1, wherein the transparent sheet is attached to the bottom of the recess portion along a border of the transparent sheet.

5. The electronic device of claim 1, wherein the printed layer has a tinted portion and a non-tinted portion, and the non-tinted portion defines the transparent pattern.

6. The electronic device of claim 1, further comprising:
- a light leakage prevention member located between the recessed portion and the light source to surround the icon generating portion to prevent light leakage.

7. The electronic device of claim 6, wherein the light leakage prevention member is made of a hollow body having a hollow portion such that light generated from the light source is transmitted to the recess portion through the hollow portion.

8. The electronic device of claim 7, wherein the light source is mounted on the circuit board, and the light source is received in the hollow portion, and the light leakage prevention member is formed of an elastic material having an upper end and a lower end such that both ends thereof are closely adhered to a bottom of the recessed portion and the circuit board, respectively.

9. The electronic device of claim 7, wherein the transparent sheet is inserted between the bottom of the recess portion and one end of the light leakage prevention member.

10. The electronic device of claim 1, wherein a portion of the outer surface of the case opposite the icon generating portion is flat, and the portion of the outer surface of the case is formed to have a non-transparent appearance when the power is not supplied to the light source.

11. An electronic device, comprising:

a case having an inner surface and an outer surface, the case being formed of a transparent material;

a light source located in the case and disposed to face the inner surface;

a circuit board connected to the light source to control power supply for the light source;

an icon generating portion disposed between the inner surface of the case and the light source, the icon generating portion having a transparent pattern corresponding to an icon such that the light from the light source passing therethrough causes the icon to be visible at the outer surface of the case;

a light leakage prevention member extending between the circuit board and the inner surface of the case, the light leakage preventing member having a hollow body such that light generated from the light source is transmitted to the inner surface of the case through the hollow body; and a non-transparent treatment layer tinted or coated at the outer surface of case such that the case has a non-transparent appearance when the power is not supplied to the light source.

12. The electronic device of claim 11, wherein the icon generating portion comprises:

a transparent sheet disposed at an inner surface of the case; and a printed layer formed on one surface of the transparent sheet to define the transparent pattern.

* * * * *